Re. 24867
April 29, 1958     W. K. MARTINEAU     2,832,608
TRAILER FOR TRANSPORTING IRRIGATION CONDUIT
Filed July 17, 1956     2 Sheets-Sheet 1
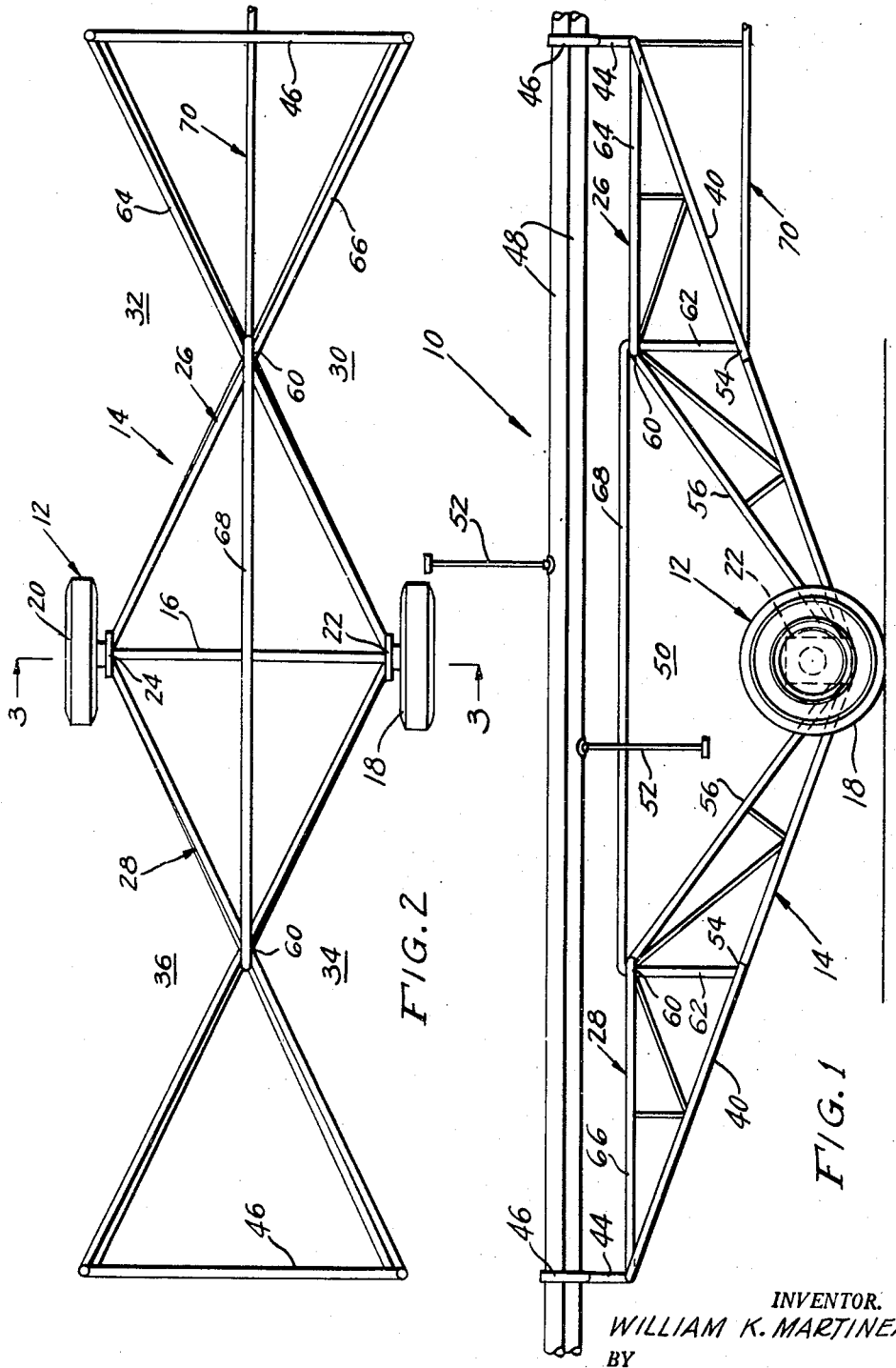
INVENTOR.
WILLIAM K. MARTINEAU
BY
McMorrow, Berman & Davidson
ATTORNEYS

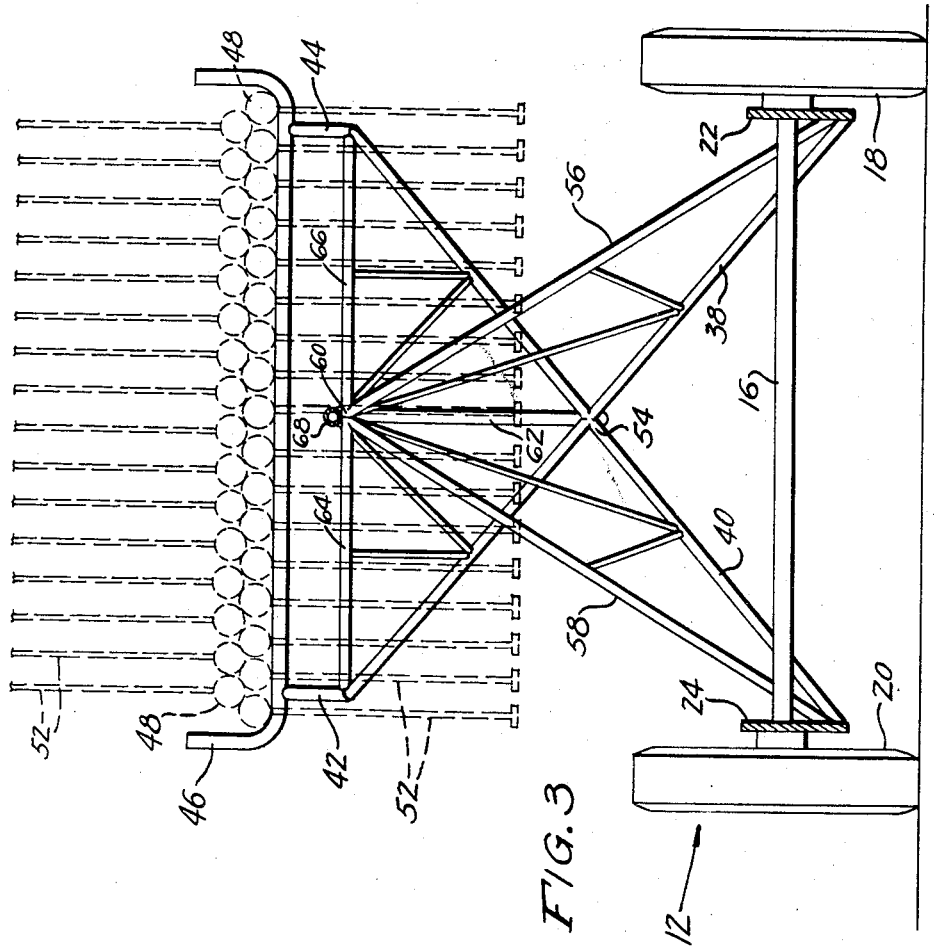

United States Patent Office 2,832,608
Patented Apr. 29, 1958

2,832,608
TRAILER FOR TRANSPORTING IRRIGATION CONDUIT
William K. Martineau, St. Anthony, Idaho
Application July 17, 1956, Serial No. 598,316
1 Claim. (Cl. 280—63)

This invention relates to a trailer for transporting lengths of irrigation pipe.

Irrigation lines usually comprise independent pipe sections of approximately 40-feet in length secured together to form laterals approximately one-quarter of a mile long, and after an area has been irrigated, the lateral is shifted to another area to be irrigated. A lateral comprises approximately 33 sections of conventional irrigation pipe, each of said sections having a lateral riser to which a revolving sprinkler head is secured, and movement of such sections is not only time consuming, but very awkward due to the great lengths of the sections.

The primary object of the invention is to provide a practical and efficient trailer for transporting a lateral composed of thirty-three sections of irrigation pipe, including their risers, with a minimum expenditure of time and effort in loading and unloading.

Another object of the invention is to provide a trailer of the character indicated which can be readily and economically manufactured, is easily used, and is highly satisfactory for the purpose intended.

These together with other objects and advantages which will become apparent reside in the details of construction and operation as more fully hereinafter described and claimed, reference being had to the accompanying drawings forming a part hereof, wherein like numerals refer to like parts throughout the several views, and in which:

Figure 1 is a right-hand side elevational view of a trailer of the invention, showing irrigation pipe sections disposed thereon;

Figure 2 is a top plan view of Figure 1, with the pipe sections removed; and

Figure 3 is an enlarged vertical transverse sectional view taken substantially on line 3—3 of Figure 2, showing in phantom lines the sections of an irrigation lateral loaded on the trailer.

Referring to the drawings in detail, the illustrated trailer, indicated generally at 10, comprises a wheel and axle assembly 12, and a frame 14.

The wheel and axle assembly 12 comprises a transverse axle 16 having suitably secured on opposite ends thereof wheels 18 and 20, the axle being journaled through spaced vertical support plates 22 and 24, as clearly seen in Figure 3.

The frame 14 comprises a pair of similar front and rear frame sections, indicated generally at 26 and 28. The frame sections 26 and 28 are substantially X-shaped when viewed in plan, and the narrow parts of these frames sections define recesses 30 and 32, and 34 and 36, on opposite sides of the frame 14, enabling a worker to get close to the longitudinal axis of the frame 14 and readily reach pipe thereon, so that loading and unloading of the trailer is facilitated.

Each of the frame sections 26 and 28 includes a pair of crossed and intersecting longitudinally lower inwardly declining straight bars 38 and 40, and secured together intermediate their ends in first intersections 54, whose inner depressed ends are secured to related ones of the support plates 22 and 24. The elevated longitudinally outward ends of the bars 38 and 40 terminate in upstanding portions 42 and 44, respectively, which are secured to the under sides of transversely disposed U-shaped pipe supporting bars 46 upon which are adapted to be laid irrigation pipe sections 48 to extend longitudinally of the trailer, with the lateral risers 52 of the lowermost layer of pipe sections disposed at the deep central portion 50 of the frame 14.

Extending forwardly and rearwardly and upwardly from the support plates 22 and 24 and spaced above related ones of the bars 38 and 40, are pairs of converging bars 56 and 58 whose upper ends intersect at 60. The intersections 54 and 60 have extending therebetween vertical brace bars 62, and extending forwardly and rearwardly from the intersections 60 and spaced above the corresponding parts of the bars 38 and 40 are diverging horizontal bars 64 and 66. Extending longitudinally between the intersections 60 of the frame sections 26 and 28 is a longitudinal bar 68.

Suitable brace rods may be secured between the various bars described above for rigidifying the frame 14.

Indicated generally at 70 is a horizontal, longitudinally extending bar having its rear end secured to the intersection 54 of the bars 38 and 40 of the front section 26, the bar 70 being adapted to be connected at its forward end to a hitch assembly (not shown) of a draft vehicle.

The foregoing is considered as illustrative of the principles of the invention. Since numerous modifications and changes will readily occur to those skilled in the art, it is not desired to limit the invention to the exact construction and operation shown and described, and accordingly, all suitable modifications and equivalents may be resorted to, as fall within the scope of the appended claims.

What is claimed is:

In a pipe section transporting trailer, a wheel and axle assembly having spaced support plates, a longitudinally elongated frame comprising front and rear sections, each of said sections comprising a pair of crossed and intersecting longitudinal lower bars having longitudinally inward and longitudinally outward ends, said lower bars being positioned in longitudinally inward declining planes with the inward ends of said lower bars secured to related ones of said support plates, said pairs of lower bars being in longitudinally outwardly converging relation to each other and secured together intermediate their ends in first intersections, vertical brace bars secured to and rising from said first intersections and having upper ends, each of said frame sections further comprising a pair of longitudinally outwardly converging upper longitudinal bars having longitudinally inward ends secured to related ones of said support plates and longitudinally outward ends secured together in second intersections at the upper ends of said vertical brace bars, the upper longitudinal bars being spaced above the lower longitudinal bars, transverse brace bars extending in diverging relationship between and secured to the second intersection and the longitudinally outward ends of the lower longitudinal bars, vertical portions on the longitudinally outward ends of the lower longitudinal bars rising above said transverse brace bars, U-shaped transverse pipe section supporting bars secured to and extending between the vertical portions of the lower longitudinal bars of the frame sections, and a longitudinal bar extending between and secured to said second intersections.

References Cited in the file of this patent
UNITED STATES PATENTS

| 528,939 | Grabill | Nov. 13, 1894 |
|---|---|---|
| 812,272 | Kaylor | Feb. 13, 1906 |
| 2,642,311 | Beyer | June 16, 1953 |
| 2,715,030 | Peterson | Aug. 9, 1955 |

FOREIGN PATENTS

| 86,145 | France | June 21, 1869 |
|---|---|---|
| 619,759 | France | Jan. 5, 1927 |